United States Patent
Mavridis et al.

(10) Patent No.: US 9,023,945 B2
(45) Date of Patent: May 5, 2015

(54) POLYETHYLENE PROCESSES AND COMPOSITIONS THEREOF

(71) Applicant: Basell Polyolefine GmbH, Wesseling (DE)

(72) Inventors: Harilaos Mavridis, Lebanon, OH (US); Gerhardus Meier, Frankfurt am Main (DE); Ulf Schueller, Frankfurt am Main (DE); Diana Doetsch, Bad Kreuznach (DE); Bernd Marczinke, Römerberg (DE); Iakovos Vittorias, Mainz (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 14/191,090

(22) Filed: Feb. 26, 2014

(65) Prior Publication Data

US 2014/0243475 A1 Aug. 28, 2014

Related U.S. Application Data

(60) Provisional application No. 61/770,049, filed on Feb. 27, 2013, provisional application No. 61/820,382, filed on May 7, 2013.

(51) Int. Cl.
| C08L 23/04 | (2006.01) |
| C08L 23/06 | (2006.01) |
| C08F 2/34 | (2006.01) |
| C08L 23/08 | (2006.01) |
| B01J 8/18 | (2006.01) |

(52) U.S. Cl.
CPC .............. *C08L 23/06* (2013.01); *C08L 23/08* (2013.01); *Y10S 526/905* (2013.01)

(58) Field of Classification Search
USPC ................................ 525/53, 240; 526/65, 905
See application file for complete search history.

(56) References Cited

U.S. PATENT DOCUMENTS

| 4,603,173 A | 7/1986 | Mack et al. |
| 7,514,508 B2 * | 4/2009 | Meier et al. ..................... 526/65 |
| 2009/0252910 A1 | 10/2009 | Baeckman et al. |

FOREIGN PATENT DOCUMENTS

| WO | WO 0185803 A1 | 11/2001 |
| WO | WO 03057746 A1 | 7/2003 |
| WO | WO 2009148487 A1 | 12/2009 |

OTHER PUBLICATIONS

The International Search Report and Written Opinion for PCT/US2014/018748 mailed May 19, 2014.

* cited by examiner

*Primary Examiner* — Fred M Teskin

(57) ABSTRACT

Embodiments of the present disclosure relate to a method of preparing polyethylene compositions comprising polymerizing ethylene in a first gas-phase reactor and polymerizing ethylene in a second gas-phase reactor in the presence of hydrogen; wherein at least one of the first or second gas-phase reactors comprises a first and second polymerization zone; wherein a hydrogen pressure of the first and second polymerization zones are different such that at least a portion of the second ethylene cycles through the first and second polymerization zones and a gas mixture of each polymerization zone is partially or totally prevented from entering the other zone.

17 Claims, 1 Drawing Sheet

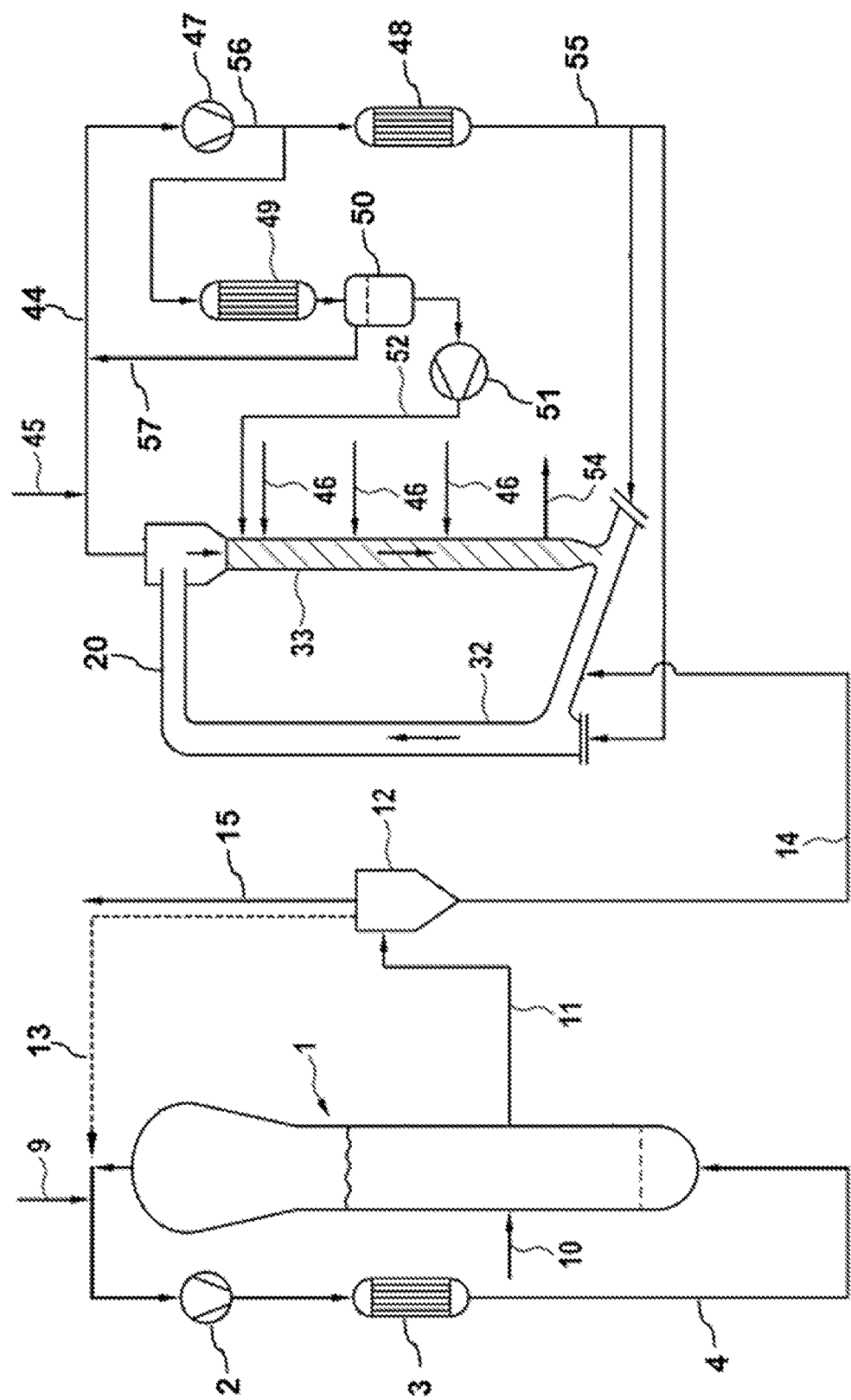

POLYETHYLENE PROCESSES AND COMPOSITIONS THEREOF

CROSS-REFERENCES TO RELATED APPLICATIONS

This application claims the benefit of U.S. Provisional Application No. 61/770,049, filed on Feb. 27, 2013, and U.S. Provisional Application No. 61/820,382, filed on May 7, 2013, the contents of each are incorporated herein by reference in their entirety.

FIELD OF THE INVENTION

The present disclosure is directed toward ethylene polymerization processes and polyethylene compositions, including those with a density of 0.950 g/cm$^3$ or higher, which may be used for making extrusion blow-molded hollow articles, including, for example, thin-walled articles, such as bottles.

BACKGROUND OF THE INVENTION

The processability and mechanical properties of polyethylene polymers have been made blending Cr-catalyzed polyethylene materials with Ziegler-Natta-catalyzed materials, as disclosed in U.S. Pat. No. 4,536,550 and International Patent Application WO 2005/097888. Mechanical blending does not always produce an ideal polymer composition, which has led to methods of producing polymers simultaneously, which may allow for mixing the different polymers at the molecular level. It remains an ongoing challenge to balance the following properties: processability, high die-swell with high-quality surface, dimensional stability, melt-processing at high shear rate values, flow-instabilities, and environmental stress cracking resistance (ESCR).

SUMMARY OF THE INVENTION

In some aspects, the present disclosure provides processes for preparing polyethylene compositions comprising the following steps, in any order:
(a) providing at least a first amount of ethylene to a first gas-phase reactor;
(b) providing at least a first amount of Ziegler-Natta catalyst to the first gas-phase reactor to produce at least a first amount of polyethylene polymer within the first gas-phase reactor;
(c) transferring at least a portion of the first amount of polyethylene polymer and at least a portion of the first amount of Ziegler-Natta catalyst to a second gas-phase reactor;
(d) providing at least a second amount of ethylene in the presence of a first amount of hydrogen to the second gas-phase reactor to obtain a second polyethylene polymer to produce a polyethylene composition comprising the first polyethylene polymer and the second polyethylene polymer;
wherein at least one of the first or second gas-phase reactors comprises a first and second polymerization zone, the first polymerization zone having a first hydrogen pressure and the second polymerization zone having a second hydrogen pressure, wherein the first hydrogen pressure and the second hydrogen pressure are different such that at least a portion of the second amount of ethylene moves through the first and second polymerization zones and at least a portion of a gas mixture of each polymerization zone is partially or totally prevented from entering the other zone. In some embodiments, the polymerizing ethylene flows upward through a first polymerization zone; leaves said the first polymerization zone and enters a second polymerization zone through which the polymerizing ethylene polymer flows downward under the action of gravity; leaves said second polymerization zone; and is reintroduced into the first polymerization zone, thus establishing a circulation of the polymerizing ethylene polymer between said first and second polymerization zones in at least one of said first and second gas-phase reactors. In some embodiments, the upward flow through the first polymerization zone is under fast fluidization or transport conditions. In some embodiments, the first polymerization zone comprises a hydrogen to ethylene ratio from about 0.25 to about 1.9. In some embodiments, the hydrogen to ethylene ratio is about 0.47. In some embodiments, the second polymerization zone comprises a hydrogen to ethylene ratio from about 0.001 to about 0.25. In some embodiments, the hydrogen to ethylene ratio is about 0.057. In some embodiments, step (c) or step (d) contain one or more comonomers. In some embodiments, step (c) and step (d) contain one or more comonomers. In some embodiments, the comonomer is a terminal alkene $(C \leq 20)$. In some embodiments, the comonomer is 1-hexene. In some embodiments, the second polymerization zone comprises a comonomer percentage from about 0.05 to about 0.2%. In some embodiments, the percentage of comonomer is about 0.09%. In some embodiments, the second polymerization zone comprises a comonomer percentage from about 0.2 to about 1.2%. In some embodiments, the percentage of comonomer is about 0.5%. In some embodiments, the process further comprises obtaining a first polyethylene in the first gas-phase reactor in the presence of hydrogen. In some embodiments, the process further comprises obtaining polyethylene in the first and second gas-phase reactors in the presence of hydrogen. In some embodiments, the hydrogen in the second gas-phase reactor is less than the hydrogen in the first gas-phase reactor. In some embodiments, the first or second gas-phase reactor further comprises propane as the inert diluent. In some embodiments, the first and second gas-phase reactor further comprises propane as the inert diluent. In some embodiments, the first gas-phase reactor is heated to a temperature from about 70° C. to about 95° C. In some embodiments, the temperature is about 80° C. In some embodiments, the first gas-phase reactor is pressurized to a pressure between about 2.5 megapascals ("MPa") to about 3.5 MPa. In some embodiments, the pressure is about 2.9 MPa. In some embodiments, the second gas-phase reactor is heated to a temperature from about 70° C. to about 95° C. In some embodiments, the temperature is about 84° C. In some embodiments, the second gas-phase reactor is pressurized to a pressure about 2.0 MPa to about 3.0 MPa. In some embodiments, the pressure is about 2.5 MPa. In some embodiments, the Ziegler-Natta polymerization catalyst comprises a solid catalyst component comprising a titanium compound on a magnesium support and an organoaluminum compound. In some embodiments, the solid catalyst component is produced by contacting the titanium compound with magnesium chloride or a precursor magnesium compound. In some embodiments, the solid catalyst component is heating to a temperature from about 130° C. to about 150° C. In some embodiments, the temperature is from about 135° C. to about 150° C. In some embodiments, the solid catalyst component is produced by contacting the titanium compound with magnesium chloride or a precursor magnesium compound in the presence of an inert medium. In some embodiments, the Ziegler-Natta polymerization catalyst further comprises an external electron donor compound. In some embodiments, the external electron donor compound is an alcohol. In some embodiments, the external electron donor compound is ethanol. In some embodiments, the Ziegler-Natta polymerization catalyst is prepolymerized with propylene. In some embodiments, the Ziegler-Natta polymerization catalyst is prepolymerized with about 1 gram polypropylene per gram of solid catalyst component. In some embodiments, the polyethylene composition comprises a density ranging from about 0.950 g/cm$^3$ to about 0.970 g/cm$^3$, alternatively greater than about 0.950 g/cm$^3$, a ratio of MIF/MIP from about 17 to about 25, a shear-induced crystallization index from about 0.15 to about 8, and a long-chain branching index lower than about 0.70. In some embodiments, the polyethylene composition further comprises an eta (0.02) from about 30,000 to about 65,000 Pascal seconds ("Pa×s"). In some embodiments, the process produces a polyethylene composition comprising:
  (A) from about 40 to about 60% by weight of an ethylene homopolymer or copolymer with density equal to or greater than about 0.960 g/cm$^3$ and melt flow index (MIE) at 190° C. with a load of 2.16 kilograms of about 5 to about 20 grams per 10 minutes ("g/10 min"); and
  (B) from about 40 to about 60% by weight of an ethylene homopolymer or copolymer having a MIE value lower than the MIE value of (A).
In some embodiments, the MIE value of ethylene copolymer in (B) is lower than about 0.5 g/10 min.

In another aspect, the present disclosure provides a polyethylene composition comprising:
  (a) a first polyethylene produced in a first gas-phase reactor in the presence of a first amount of hydrogen; and
  (b) a second polyethylene produced in a second gas-phase reactor in the presence of a second amount of hydrogen, wherein the second amount of hydrogen is less than the first amount of hydrogen;
wherein the first polyethylene and the second polyethylene are produced in any order and in the presence of a Ziegler-Natta catalyst, wherein at least one of the first or second gas-phase reactors comprises a first and second polymerization zone, the first polymerization zone having a first hydrogen pressure and the second polymerization zone having a second hydrogen pressure, wherein the first hydrogen pressure and the second hydrogen pressure are different such that at least a portion of the second amount of ethylene moves through the first and second polymerization zones and at least a portion of a gas mixture of each polymerization zone is partially or totally prevented from entering the other zone. In some embodiments, in at least one of said first and second gas-phase reactors, a polymerizing ethylene polymer: flows upward through a first polymerization zone; leaves said the first polymerization zone and enters a second polymerization zone through which the polymerizing ethylene polymer flows downward under the action of gravity; leaves said second polymerization zone; and is reintroduced into the first polymerization zone, thus establishing a circulation of the polymerizing ethylene polymer between said first and second polymerization zones in at least one of said first and second gas-phase reactors. In some embodiments, the upward flow through the first polymerization zone is under fast fluidization or transport conditions. In some embodiments, step (a) or step (b) contain one or more comonomers. In some embodiments, step (a) and step (b) contain one or more comonomers. In some embodiments, the comonomer is a terminal alkene $_{(C\leq 20)}$. In some embodiments, the comonomer is 1-hexene. In some embodiments, the process further comprises obtaining a first polyethylene in the first gas-phase reactor in the presence of hydrogen. In some embodiments, the process further comprises obtaining polyethylene in the first and second gas-phase reactors in the presence of hydrogen. In some embodiments, the hydrogen in the second gas-phase reactor is less than the hydrogen in the first gas-phase reactor. In some embodiments, the first or second gas-phase reactor further comprises propane as the inert diluent. In some embodiments, the first and second gas-phase reactor further comprises propane as the inert diluent. In some embodiments, the first gas-phase reactor is heated to a temperature from about 70° C. to about 95° C. In some embodiments, the temperature is about 80° C. In some embodiments, the first gas-phase reactor is pressurized to a pressure between about 2.5 MPa to about 3.5 MPa. In some embodiments, the pressure is about 2.9 MPa. In some embodiments, the second gas-phase reactor is heated to a temperature from about 70° C. to about 95° C. In some embodiments, the temperature is about 84° C. In some embodiments, the second gas-phase reactor is pressurized to a pressure about 2.0 MPa to about 3.0 MPa. In some embodiments, the pressure is about 2.5 MPa. In some embodiments, the Ziegler-Natta polymerization catalyst comprises a solid catalyst component comprising a titanium compound on a magnesium support and an organoaluminum compound. In some embodiments, the solid catalyst component is produced by contacting the titanium compound with magnesium chloride or a precursor magnesium compound. In some embodiments, the solid catalyst component is heating to a temperature from about 130° C. to about 150° C. In some embodiments, the temperature is from about 135° C. to about 150° C. In some embodiments, the solid catalyst component is produced by contacting the titanium compound with magnesium chloride or a precursor magnesium compound in the presence of an inert medium. In some embodiments, the Ziegler-Natta polymerization catalyst further comprises an external electron donor compound. In some embodiments, the external electron donor compound is an alcohol. In some embodiments, the external electron donor compound is ethanol. In some embodiments, the Ziegler-Natta polymerization catalyst is prepolymerized with propylene. In some embodiments, the solid catalyst component is prepolymerized with about 1 gram polypropylene per gram of solid catalyst component. In some embodiments, the polyethylene composition comprises a density of from about 0.950 g/cm$^3$ to about 0.970 g/cm$^3$, alternatively greater than about 0.950 g/cm$^3$, a ratio of MIF/MIP from about 17 to about 25, a shear-induced crystallization index from about 0.15 to about 8, and a long-chain branching index lower than about 0.70. In some embodiments, the polyethylene composition further comprises an eta (0.02) from about 30,000 to about 65,000 Pa×s. In some embodiments, the polyethylene composition comprises:
  (A) from about 40 to about 60% by weight of an ethylene homopolymer or copolymer with density equal to or greater than about 0.960 g/cm$^3$ and melt flow index (MIE) at 190° C. with a load of 2.16 kilograms of about 5 to about 20 g/10 min; and
  (B) from about 40 to about 60% by weight of an ethylene homopolymer or copolymer having a MIE value lower than the MIE value of (A).
In some embodiments, the MIE value of ethylene copolymer in (B) is lower than about 0.5 g/10 min.

In yet another aspect, the present disclosure provides a polyethylene composition comprising:
  (A) a density ranging from about 0.950 g/cm$^3$ to about 0.970 g/cm$^3$ and alternatively greater than about 0.950 g/cm$^3$;
  (B) a ratio of MIF/MIP from about 17 to about 25;
  (C) a shear-induced crystallization index from about 0.15 to about 8; and
  (D) a long-chain branching index lower than about 0.70.

In some embodiments, the polyethylene composition further comprising:
(E) eta (0.02) from about 30,000 to about 65,000 Pascal seconds ("Pa×s") and alternatively from about 30,000 to about 45,000 Pa×s.

In some embodiments, the density is greater than about 0.952 g/cm$^3$. In some embodiments, the density is greater than about 0.953 g/cm$^3$. In some embodiments, the ratio of MIF/MIP is from about 19 to about 23. In some embodiments, the SIC Index is from about 0.15 to about 2. In some embodiments, the SIC Index is from about 0.2 to about 2. In some embodiments, the long-chain branching index is equal to or is lower than about 0.69. In some embodiments, the long-chain branching index is equal to or is lower than about 0.65. In some embodiments, the eta (0.02) is from about 31,000 to about 43,000 Pa×s. In some embodiments, the polyethylene composition further comprises one or more ethylene copolymers. In some embodiments, the polyethylene composition comprises a comonomer content equal to or less than about 1.2% by weight. In some embodiments, the polyethylene composition is produced using a Ziegler-Natta polymerization catalyst. In some embodiments, the Ziegler-Natta polymerization catalyst comprises contacting a solid catalyst component and an organoaluminum compound. In some embodiments, the Ziegler-Natta polymerization catalyst further comprises the addition of an external electron donor compound. In some embodiments, the solid catalyst component comprises a titanium compound supported on magnesium chloride. In some embodiments, the solid catalyst component comprises contacting a titanium compound with MgCl$_2$ or a precursor Mg compound at a temperature from about 130° C. to about 150° C. In some embodiments, the temperature is from about 135° C. to about 150° C. In some embodiments, the solid catalyst component is produced by contacting the titanium compound with the MgCl$_2$ or a precursor Mg compound in an inert medium. In some embodiments, the polyethylene composition further comprises at least one characteristic selected from:
(a) a $M_w$ equal to or lower than about 320,000 grams/mole ("g/mol");
(b) a $M_w/M_n$ ratio from about 20 to about 30;
(c) a MIP from about 0.9 to about 2.1 g/10 min, alternatively from about 1.2 to about 2.1 g/10 min; and
(d) a MIF from about 20 to about 45 grams/10 min, alternatively from about 26 to about 34 g/10 min.

In some embodiments, $M_w$ is equal to or is lower than about 300,000 g/mol. In some embodiments, $M_w$ is from about 180,000 g/mol to about 280,000 g/mol. In some embodiments, the polyethylene composition comprises:
(A) from about 40 to about 60% by weight of an ethylene homopolymer or copolymer with density equal to or greater than about 0.960 g/cm$^3$ and melt flow index (MIE) at 190° C. with a load of 2.16 kilograms of about 5 to about 20 g/10 min; and
(B) from about 40 to about 60% by weight of an ethylene homopolymer or copolymer having a MIE value lower than the MIE value of (A).

In some embodiments, the MIE value of ethylene copolymer in (B) is lower than about 0.5 g/10 min.

In yet another aspect, the present disclosure provides a manufactured article comprising the polyethylene composition of the present disclosure. In some embodiments, the article is produced by blow-molded extrusion. In some embodiments, the articles are hollow articles, alternatively thin-walled articles, and alternatively bottles.

BRIEF DESCRIPTION OF THE DRAWINGS

These and other features, aspects, and advantages of the present disclosure will become better understood with reference to the following description and appended claims, and accompanying drawing figures where:

The FIGURE is an illustrative embodiment of a simplified process-flow diagram of two serially connected gas-phase reactors suitable for use in accordance with various embodiments of ethylene polymerization processes disclosed herein to produce various embodiments of the polyethylene compositions disclosed herein.

It should be understood that the various embodiments are not limited to the arrangements and instrumentality shown in the drawing figures.

DETAILED DESCRIPTION OF EMBODIMENTS

The expressions "polyethylene composition", "polyethylene", "ethylene polymer", and related terms are intended to embrace, as alternatives, both a single ethylene polymer and an ethylene polymer composition, in particular a composition of two or more ethylene polymer components. In some embodiments, the polyethylene composition includes two or more ethylene polymer components with different molecular weights. In some aspects, a composition comprising two or more ethylene polymer components with different molecular weights may also be described as "bimodal" or "multimodal" polymer in the relevant art. In some embodiments, the polyethylene composition of the present disclosure comprises one or more ethylene copolymers. Ratios of the present disclosure shall are molar ratios, unless otherwise indicated to a person of ordinary skill.

When used in the context of a chemical group: "hydrogen" means —H; "hydroxy" means —OH; and "halo" means one or more elements independently selected from the groups consisting of —F, —Cl, —Br and —I.

For the groups and classes below, the following parenthetical subscripts further define the group/class as follows: "(Cn)" defines the exact number (n) of carbon atoms in the group/class. "(C≤n)" defines the maximum number (n) of carbon atoms that can be in the group/class, with the minimum number as small as possible for the group in question, e.g., it is understood that the minimum number of carbon atoms in the group "alkenyl$_{(C≤8)}$" or the class "alkene$_{(C≤8)}$" is two. For example, "alkoxy$_{(C≤10)}$" designates those alkoxy groups having from 1 to 10 carbon atoms. (Cn-n') defines both the minimum number (n) and maximum number (n') of carbon atoms in the group. Similarly, "alkyl$_{(C2-10)}$" designates those alkyl groups having from 2 to 10 carbon atoms.

The term "saturated" as used herein means the compound or group so modified has no carbon-carbon double and no carbon-carbon triple bonds, except as noted below. In the case of substituted versions of saturated groups, one or more carbon oxygen double bond or a carbon nitrogen double bond may be present. And when such a bond is present, then carbon-carbon double bonds that may occur as part of keto-enol tautomerism or imine/enamine tautomerism are not precluded.

The term "aliphatic" when used without the "substituted" modifier signifies that the compound/group so modified is an acyclic or cyclic, but non-aromatic hydrocarbon compound or group. In aliphatic compounds/groups, the carbon atoms can be joined together in straight chains, branched chains, or non-aromatic rings (alicyclic). Aliphatic compounds/groups can be saturated, that is joined by single bonds (alkanes/alkyl), or unsaturated, with one or more double bonds (alkenes/alkenyl) or with one or more triple bonds (alkanes/alkenyl).

The term "alkyl" when used without the "substituted" modifier refers to a monovalent saturated aliphatic group with a carbon atom as the point of attachment, a linear or branched, cyclo, cyclic or acyclic structure, and no atoms other than carbon and hydrogen. Thus, as used herein cycloalkyl is a subset of alkyl, with the carbon atom that forms the point of attachment also being a member of one or more non-aromatic ring structures wherein the cycloalkyl group consists of no atoms other than carbon and hydrogen. As used herein, the term does not preclude the presence of one or more alkyl groups (carbon number limitation permitting) attached to the ring or ring system. The groups —CH$_3$ (Me), —CH$_2$CH$_3$ (Et), —CH$_2$CH$_2$CH$_3$ (n-Pr or propyl), CH(CH$_3$)$_2$ (i-Pr, $^i$Pr or isopropyl), —CH(CH$_2$)$_2$ (cyclopropyl), —CH$_2$CH$_2$CH$_2$CH$_3$ (n-Bu), CH(CH$_3$)CH$_2$CH$_3$ (sec-butyl), —CH$_2$CH(CH$_3$)$_2$ (isobutyl), —C(CH$_3$)$_3$ (tert-butyl, t-butyl, t-Bu or $^t$Bu), —CH$_2$C(CH$_3$)$_3$ (neo-pentyl), cyclobutyl, cyclopentyl, cyclohexyl, and cyclohexylmethyl are non-limiting examples of alkyl groups. An "alkane" refers to the compound H—R, wherein R is alkyl as this term is defined above. When any of these terms is used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —NHCH$_3$, —NHCH$_2$CH$_3$, —N(CH$_3$)$_2$, —C(O)NH$_2$, —OC(O)CH$_3$, or —S(O)$_2$NH$_2$. The following groups are non-limiting examples of substituted alkyl groups: —CH$_2$OH, —CH$_2$Cl, —CF$_3$, —CH$_2$CN, —CH$_2$C(O)OH, CH$_2$C(O)OCH$_3$, —CH$_2$C(O)NH$_2$, CH$_2$C(O)CH$_3$, —CH$_2$OCH$_3$, —CH$_2$OC(O)CH$_3$, —CH$_2$NH$_2$, —CH$_2$N (CH$_3$)$_2$, and —CH$_2$CH$_2$Cl. The term "haloalkyl" is a subset of substituted alkyl, in which one or more hydrogen atoms has been substituted with a halo group and no other atoms aside from carbon, hydrogen and halogen are present. The group, —CH$_2$Cl is a non-limiting example of a haloalkyl. The term "fluoroalkyl" is a subset of substituted alkyl, in which one or more hydrogen has been substituted with a fluoro group and no other atoms aside from carbon, hydrogen and fluorine are present. The groups, —CH$_2$F, —CF$_3$, and —CH$_2$CF$_3$ are non-limiting examples of fluoroalkyl groups.

The term "alkenyl" when used without the "substituted" modifier refers to an monovalent unsaturated aliphatic group with a carbon atom as the point of attachment, a linear or branched, cyclo, cyclic or acyclic structure, at least one non-aromatic carbon-carbon double bond, no carbon-carbon triple bonds, and no atoms other than carbon and hydrogen. Non-limiting examples of alkenyl groups include: —CH═CH$_2$ (vinyl), —CH═CHCH$_3$, —CH═CHCH$_2$CH$_3$, —CH$_2$CH═CH$_2$ (allyl), —CH$_2$CH═CHCH$_3$, and —CH═CHCH═CH$_2$. The term "alkenediyl" when used without the "substituted" modifier refers to a divalent unsaturated aliphatic group, with two carbon atoms as points of attachment, a linear or branched, cyclo, cyclic or acyclic structure, at least one nonaromatic carbon-carbon double bond, no carbon-carbon triple bonds, and no atoms other than carbon and hydrogen. The groups, —CH═CH—, —CH═C(CH$_3$)CH$_2$—, —CH═CHCH$_2$—, and

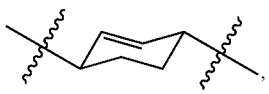 [SMILES: *C1C=CC(*)CC1]

are non-limiting examples of alkenediyl groups. It is noted that while the alkenediyl group is aliphatic, once connected at both ends, this group is not precluded from forming part of an aromatic structure. The terms "alkene" or "olefin" are synonymous and refer to a compound having the formula H—R, wherein R is alkenyl as this term is defined above. A "terminal alkene" refers to an alkene having just one carbon-carbon double bond, wherein that bond forms a vinyl group at one end of the molecule. When any of these terms are used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —NHCH$_3$, —NHCH$_2$CH$_3$, —N(CH$_3$)$_2$, —C(O)NH$_2$, —OC(O)CH$_3$, or —S(O)$_2$NH$_2$. The groups, —CH═CHF, —CH═CHCl and —CH═CHBr, are non-limiting examples of substituted alkenyl groups.

In some aspects of the present disclosure, one or more of the following abbreviations is used: g/cm$^3$, grams per cubic centimeter; ESCR, environmental stress cracking resistance; MPa, megapascals; ° C., degrees Celsius; g or gr, grams; g/10 min, grams per 10 minutes; Pa×s, pascal seconds; g/mol, grams per mole; RPM, revolutions per minute; % wt, percent by weight; ppm, parts per million; h or hr, hour(s); m or min, minute(s); m/s, meters per second; rad/s, radians per second; kJ/m$^2$, kilojoules per square meter; dL/g, deciliters per gram; µL, microliters; mm, millimeters; K/min, Kelvin per minute; s or sec, seconds; mg, milligrams; ml or mL, milliliters; mg/L, milligrams per liter; kg/h, kilograms per hour; g/h, grams per hour; or nm, nanometers.

In some embodiments, the ethylene polymer or ethylene polymer composition of the present disclosure is defined by the polymer properties described herein. In some embodiments, the addition of other components, including additives normally employed in the art, can modify one or more of said properties of the polymers and polymers comprising these additional components are specifically included. In some embodiments, the polyethylene polymerization methods of the disclosure do not require mechanical blending of two components obtained by using different polymerization catalysts.

The ratio MIF/MIP provides a rheological measure of molecular weight distribution. MIF and MIP are each standard measurements which are known to those of skill in the art. Both measurements are defined as the melt flow index (g/10 minutes) measured at T=190° C. with 21.6 kilograms load or with 5.0 kilograms load and can be found in standard, ISO 1133.

Another measure of the molecular weight distribution is provided by the ratio $M_w/M_n$, where $M_w$ is the weight average molar mass and $M_n$ is the number average molar mass, both measured by GPC (Gel Permeation Chromatography). The methods of determining these measurements are defined in the Examples section and are provided by the standard ISO 16014-1, -2, -4, in the issue released in 2003. In some embodiments, the $M_w/M_n$ values for the polyethylene composition of the present disclosure range from about 20 to about 30.

In some embodiments, an polyethylene composition according to the present disclosure further comprises one or more of the following additional features:

$M_w$ equal to or lower than about 320,000 g/mol, more preferably equal to or lower than about 300,000 g/mol, in particular from about 280,000 to about 180,000 g/mol;

$M_z/M_w$ of more than about 4, in particular of more than about 4.25;

MIP: from about 0.9 to about 2.1 g/10 min, alternatively from about 1.2 to about 1.9 g/10 min;

MIF: from about 20 to about 45 g/10 min, alternatively from about 26 to about 34 g/10 min;

MIE (melt flow index at 190° C. with a load of 2.16 kilograms, according to ISO 1133): of less than about 5 grams/10 minutes, in particular of less than about 1 g/10 min;

Titanium content from about 0.5 to about 4 parts per million (or "ppm") by weight;

Magnesium content from about 5 to about 15 ppm by weight;

Comonomer content equal to or less than about 1.2% by weight, in particular from about 0.05 to about 1.2% by weight, with respect to the total weight of the composition;

OIT at 200° C. (Oxidative Induction Time according to ASTM DE308) of more than about 6 minutes in particular of more than about 10 minutes; and CIT (Whiteness Index according to ASTM E308) of more than about 80.

In some embodiments, the polyethylene composition may further comprise a comonomer or comonomers present in the ethylene copolymers are generally selected from olefins having formula $CH_2=CHR$ wherein R is an alkyl$_{(C \leq 12)}$ or substituted alkyl$_{(C \leq 12)}$. Some non-limiting examples of comonomers include propylene, 1-butene, 1-pentene, 4-methylpent-1-ene, 1-hexene, 1-octene, and 1-decene. In some embodiments, the comonomer is 1-hexene.

The density of a polyethylene composition can be used to determine potential uses of the polymer. In some embodiments, the density for the polyethylene compositions according to the present disclosure are:

from about 0.950 to about 0.970 g/cm³, or from about 0.950 to about 0.960 g/cm³, or from about 0.950 to about 0.959 g/cm³' from about 0.952 to about 0.970 g/cm³, or from about 0.952 to about 0.960 g/cm³, or from about 0.950 to about 0.959 g/cm³;

from about 0.953 to about 0.970 g/cm³, or from about 0.950 to about 0.960 g/cm³, or from about 0.953 to about 0.959 g/cm³.

In some aspects, the long chain branching index of the present disclosure can impact the uses of the polymer. The long chain branching index is defined as the ratio of the measured mean-square radius of gyration $R_g$, measured by GPC-MALLS, to the mean-square radius of gyration for a linear PE having the same molecular weight or as defined in the Examples. In some embodiments, the ranges of LCBI for the polyethylene composition of the present disclosure are from less than about 0.70 to about 0.50. In some embodiments, the LCBI range is from about 0.69 to about 0.50. In some embodiments, the LCBI range is from about 0.65 to about 0.50.

In some embodiments, the polyethylene composition comprises two polyethylene homopolymers or copolymers or a homopolymer and copolymer. In some embodiments, one polyethylene component comprises between about 1 and about 99% by weight of the total weight and the other polyethylene component comprises the remaining percentage of the total weight. In a preferred embodiment, the present composition comprises:

(A) about 40 to about 60% by weight of an ethylene homopolymer or copolymer with density equal to or greater than about 0.960 g/cm³ and melt flow index MIE at 190° C. with a load of 2.16 kilograms, according to ISO 1133, of about 5 to about 20 g/10 min.;

(B) about 40 to about 60% by weight of an ethylene copolymer having a MIE value lower than the MIE value of (A), preferably lower than about 0.5 g/10 min.

In some embodiments, (A) comprises a homopolymer. The above percent amounts are given with respect to the total weight of (A)+(B) provided that the total weight is not greater than 100 percent. The amount of comonomer in (B) is preferably from about 0.1 to about 2% by weight, with respect to the total weight of (B).

In some aspects, the present polyethylene composition is used in the preparation of extrusion blow-molded hollow articles. In some embodiments, the polyethylene composition is used to produce small blow molded articles. Some non-limiting examples of small blow molded articles include bottles, pipes, seals, rails, cases, and containers. In some embodiments, the polyethylene compositions require less than about 100 ppm to zero oxygen during pelletization. Without being bound by theory, a low concentration of oxygen during pelletization improves resin color, manufacturing variability, and reduce the propensity for gels to form in the resin thus expanding the potential applications of the composition. Further uses of a polyethylene composition of the present disclosure would be known to one of skill in the art and based upon the exact properties of the polyethylene composition produced. In some embodiments, the polyethylene composition comprises the one or more of the following desirable properties:

Die swell-ratio equal to or greater than about 160%; in particular from about 160 to about 185%, preferably from about 162 to about 170%;

Tensile Notch Impact (T=-30° C.) of about 80 kilojoules per meter squared ("kJ/m²") or higher;

Charpy aCN (T=-30° C.) of 4 or higher;

Environmental stress crack resistance measured by FNCT 4 MPa/80° C.>about 2 hours.

In some embodiments, the polyethylene composition of the present disclosure can be melt-processed at high values of shear rate, still without undergoing pressure oscillations and flow-instabilities making it useful for the preparation of extrusion blow-molded hollow articles.

The polyethylene composition described in the present disclosure can be prepared using various kinds of polymerization processes including but not limited to gas phase, solution phase, multi-phase, or slurry polymerization. Additionally, the polyethylene composition can be prepared using any catalyst known to enhance the production of polyolefins including but not limited to Ziegler-Natta catalyst, a metallocene, or a chromium based catalyst. In some preferred embodiments, the polyethylene composition of the present disclosure can be prepared by a gas phase polymerization process in the presence of a Ziegler-Natta catalyst.

A Ziegler-Natta catalyst comprises the product of the reaction of an organometallic compound of group 1, 2 or 13 of the Periodic Table of elements with a transition metal compound of groups 4 to 10 of the Periodic Table of Elements (new notation). In particular, the transition metal compound can be selected among compounds of Ti, V, Zr, Cr, and Hf and is preferably supported on $MgCl_2$. In some embodiments, the catalyst comprises the product of the reaction of said organometallic compound of group 1, 2 or 13 of the Periodic Table of elements, with a solid catalyst component comprising a Ti compound supported on $MgCl_2$. In some embodiments, the organometallic compounds contain Al, B, and/or Li. In some embodiments, the organometallic compounds are organoaluminum compounds. In some embodiments, these organoaluminum compounds include aluminoxanes or trialkylaluminum.

In certain embodiments, polyethylene compositions according to the present disclosure are obtainable by using a Ziegler-Natta polymerization catalyst. In some embodiments, the Ziegler-Natta catalyst is supported on $MgCl_2$. In some embodiments, the Ziegler-Natta catalyst is the product of reaction of:

(a) a solid catalyst component comprising a Ti compound supported on $MgCl_2$;
(b) an organoaluminum compound; and optionally
(c) an external electron donor compound $ED_{ext}$.

In certain embodiments, the titanium compound used in the Ziegler-Natta polymerization catalyst is a titanium(IV) salt. In some embodiments, the titanium compounds are the tetrahalides or the compounds of formula $TiX_n(OR^1)_{4-n}$, where $0 \leq n \leq 3$, X is halo, and $R^1$ is $alkyl_{(C \leq 10)}$ group. In some embodiments, the titanium compounds are titanium tetrachloride or titanium tetraalkoxylate.

In the solid catalyst component, a variety of different solid supports may be used including magnesium salts, silica, alumina, titanium oxide, or another porous inert material with a high surface area. In some embodiments, $MgCl_2$ is the basic support. In some embodiments, the $MgCl_2$ contains minor amount of additional carriers so long as $MgCl_2$ comprises greater than 50% of the solid support. The use of $MgCl_2$ or $MgCl_2$ obtained from precursor Mg compounds that can be transformed into $MgCl_2$ by the reaction with halogenating compounds is contemplated. In some embodiments, $MgCl_2$ in active form as taught by U.S. Pat. Nos. 4,298,718 and 4,495,338, which are incorporated herein by reference, is used as a support for a Ziegler-Natta catalysis. Without being bound by theory, magnesium dihalides in active form used as support or co-support are characterized by X-ray spectra in which the most intense diffraction line that appears in the ASTM-card reference of the spectrum of the non-active halide is diminished in intensity and broadened. In some embodiments, the diminished intensity and broadening of the most intense diffraction line results in the line being replaced by a halo peak whose maximum intensity is displaced towards lower angles relative to that of the most intense line.

In some embodiments, polyethylene compositions according to the present disclosure are prepared using catalysts wherein the solid catalyst component is obtained by contacting the titanium compound with $MgCl_2$ or a precursor Mg compound at a temperature from 130 to 150° C. In some embodiments, the preparation comprises contacting the titanium compound with the $MgCl_2$ or precursor Mg compound in an inert environment. In some embodiments, the temperature is preferable from about 135 to about 150° C. The contact with the titanium compound may be carried out one, two, three, four, or more times. In some embodiments, the contact with the titanium compound is carried out for a total time period from about 1 hour to about 4 hours. The preparation of the solid catalyst may comprise raising the temperature over a period of time from about 30 minutes to about 2 hours and then holding the reaction at that temperature for a time period from about 30 minutes to about 2 hours.

In some embodiments, contacting the $MgCl_2$ or the precursor Mg compound with the titanium is carried out in the presence of an electron donor compound. Non-limiting examples of electron donor compounds include compounds which contain a lone pair of electrons or a net negative dipole on the surface of the molecule. In some embodiments, the electron donor compound used to prepare the said Ziegler-Natta catalysts is preferably selected from the group consisting of ethers, esters, amines, ketones, nitriles, silanes and their mixtures.

In some embodiments, a precursor of $MgCl_2$ can be used as starting Mg compound. In some embodiments, the Mg compound is of the formula $MgR'_2$ where the R' is $alkyl_{(C \leq 20)}$, substituted $alkyl_{(C \leq 20)}$, OR, OCOR, or chlorine, where R is $alkyl_{(C \leq 20)}$, substituted $alkyl_{(C \leq 20)}$, provided that R' is not both chlorine. Furthermore, the Lewis adducts between $MgCl_2$ and suitable Lewis bases may also be used as Mg precursor compounds. A particular and preferred class being constituted by the $MgCl_2$ $(R"OH)_m$ adducts in which R" is $alkyl_{(C \leq 20)}$ or substituted $alkyl_{(C \leq 20)}$, and m is from about 0.1 to about 6. In some embodiments, m is about 0.5 to about 3. In some embodiments, m is about 0.5 to about 2. Adducts of this type may be obtained by mixing alcohol and $MgCl_2$ in the presence of an inert hydrocarbon immiscible with the adduct, operating under stirring conditions at the melting temperature of the adduct (100-130° C.). Then, the emulsion is quickly quenched causing the solidification of the adduct into spherical particles. Representative methods for the preparation of these spherical adducts are reported for example in U.S. Pat. No. 4,469,648; U.S. Pat. No. 4,399,054, and International Patent Application WO 98/44009, which are incorporated herein by reference. Another useable method for the spherulization is the spray cooling described for example in U.S. Pat. Nos. 5,100,849 and 4,829,034, which are both incorporated herein by reference.

In some embodiments, the $MgCl_2.(EtOH)_m$ adducts in which m is from about 0.15 to about 1.7 are obtained by subjecting the adducts with a higher alcohol content to a thermal dealcoholation process. The dealcoholation process may be carried out in nitrogen flow at temperatures comprised between about 50 and about 150° C. until the alcohol content is reduced to the above value. This process is described, for example, in European Patent EP 395083, which is incorporated herein. In some embodiments, the dealcoholation can also be carried out chemically by contacting the adduct with compounds capable to react with the alcohol groups.

In some embodiments, these dealcoholated adducts are also characterized by a porosity (measured by mercury method) with pores radius up to about 0.1 μm and pore volumes ranging from about 0.15 to about 2.5 $cm^3/g$. In some embodiments, the pore volumes range from about 0.25 to about 1.5 $cm^3/g$.

The solid may be recovered by separation of the suspension via the conventional methods (such as settling and removing of the liquid, filtration, centrifugation) and may be subject to washings with solvents. In some embodiments, the solid residue is washed with inert hydrocarbon liquids. In other embodiments, the solid residue is washed using more polar solvents (having for example a higher dielectric constant) including halogenated hydrocarbons.

In some embodiments, the solid catalyst component is converted into catalysts for the polymerization of olefins by reacting it, according to known methods, with an organometallic compound of group 1, 2 or 13 of the Periodic Table of elements. In some embodiments, the organometallic compound is an organoaluminum. In some embodiments, the organoaluminum is $Al(Y_1)_3$ where $Y_1$ is an $alkyl_{(C \leq 20)}$, a hydride, or a halide. In some embodiments, the organoaluminum is a trialkylaluminum compound. Some non-limiting examples of trialkylaluminum compounds include triethylaluminum, triisobutylaluminum, tri-n-butylaluminum, tri-n-hexylaluminum, tri-n-octylaluminum. The use of alkylaluminum halides, alkylaluminum hydrides or alkylaluminum sesquichlorides such as $AlEt_2Cl$ and $Al_2Et_3Cl_3$ in mixture with said trialkylaluminum compounds is also envisioned.

In some embodiments, the catalyst can be prepolymerized according to known techniques by producing reduced amounts of polyolefin before the polymerization require to produce the present disclosure. In some embodiments, the polyolefin is either polypropylene or polyethylene. The amount of prepolymer produced may be from about 0.5 grams per gram of component a) to about 500 grams per gram of component a). In some embodiments, the amount of prepolymer produced is about 1 gram per gram of solid catalyst.

In some aspects of the present disclosure, polyethylene compositions according to the present disclosure can be prepared using a polyethylene catalyst described above in a process comprising the following steps:
- (a) providing at least a first amount of ethylene to a first gas-phase reactor;
- (b) providing at least a first amount of Ziegler-Natta catalyst to the first gas-phase reactor to produce at least a first amount of polyethylene polymer within the first gas-phase reactor;
- (c) transferring at least a portion of the first amount of polyethylene polymer and at least a portion of the first amount of Ziegler-Natta catalyst to a second gas-phase reactor;
- (d) providing at least a second amount of ethylene in the presence of a first amount of hydrogen to the second gas-phase reactor to obtain a second polyethylene polymer to produce a polyethylene composition comprising the first polyethylene polymer and the second polyethylene polymer;

wherein at least one of the first or second gas-phase reactors comprises a first and second polymerization zone, the first polymerization zone having a first hydrogen pressure and the second polymerization zone having a second hydrogen pressure, wherein the first hydrogen pressure and the second hydrogen pressure are different such that at least a portion of the second amount of ethylene moves through the first and second polymerization zones and at least a portion of a gas mixture of each polymerization zone is partially or totally prevented from entering the other zone. In some embodiments, in at least one of the first and second gas-phase reactors, growing polymer particles flow upward through a first polymerization zone (also called a "riser" herein) under fast fluidization or transport conditions, leave the riser and enter a second polymerization zone (also called a "downcomer" herein) through which it flows downward under gravity, leave the downcomer and are reintroduced into the riser, thus establishing a circulation of polymer between the two polymerization zones. In some embodiments, the polymerization of ethylene in either step (a) or step (d) further comprises a comonomer. In some embodiments, the polymerization of ethylene in step (a) further comprises hydrogen.

In the first polymerization zone (riser), fast fluidization conditions are established by feeding a gas mixture comprising one or more olefins (ethylene and comonomers) at a velocity higher than the transport velocity of the polymer particles. The velocity of said gas mixture is preferably comprised between about 0.5 and about 15 meters per second ("m/s"), more preferably between about 0.8 and about 5 m/s. The terms "transport velocity" and "fast fluidization conditions" are well known in the art. For an alternative definition of these terms, see, for example, D. Geldart, 1986, which is incorporated herein by reference.

In some aspects of the present disclosure, a restriction is introduced between the first polymerization zone (riser) and the second polymerization zone (downcomer). In some embodiments, the restriction gives rise to individual throughput conditions in each of the polymerization zone. In some embodiments, the individual throughput conditions comprise changing the hydrogen or comonomer concentration in the polymerization zone. In some embodiments, the restriction comprises a barrier. In some embodiments, the barrier is a liquid or gas barrier. In some embodiments, the gas mixture coming from the riser to be partially or totally prevented by the barrier from entering the downcomer. In some embodiments, the condition necessary to create a barrier can be achieved by introducing into the upper part of the downcomer a gas and/or liquid mixture having a composition different from the gaseous mixture present in the riser. In some embodiments, this gas/liquid mixture to be fed into the upper part of the downcomer partially or totally replaces the gas mixture entrained with the polymer particles entering the downcomer. Furthermore, in some embodiments, the flow rate of the gas or liquid mixture can be regulated, so that a flow of gas achieves a counter-current to the flow of polymer particles in the upper part of the downcomer.

In some aspects of the present disclosure, the barrier in the second polymerization zone is a gas barrier. Without being bound by theory, the counter-current flow of gas acting as a barrier to the gas mixture coming from the riser which is entrained among the polymer particles because the established flow of gas upward has the effect of preventing the gas mixture present in the riser from entering the downcomer. In some embodiments, the mixture of different composition to be fed at the upper part of the downcomer can be in a partially or totally liquefied form. The liquefied gas mixture can also be sprinkled in the downcomer such that the evaporation of the liquid in the polymerization zone will provide the required gas flow.

In some aspects of the present disclosure, the barrier in the second polymerization zone is a liquid barrier. In some embodiments, the barrier comprises introducing a liquid solution comprising into the downcomer. Without being bound by theory, the liquid solution disentrains the gas mixture from the riser from the polyethylene such that the concentration of hydrogen and comonomer in the downcomer approaches that of the liquid solution. In some embodiments, the liquid barrier comes from the recycled stream of unreacted gas molecules from the riser.

In one aspect, in the second polymerization zone (downcomer), the polymer particles flow under the action of gravity in a more dense form, so that high values of density of the solid are reached (mass of polymer per volume of reactor). In some embodiments, these density values may approach the bulk density of the polymer. Applicant presently believes that the polymer flows vertically down through the downcomer in a "plug flow" (packed flow mode), so that only small quantities of gas are entrained between the polymer particles. In some embodiments, the process produces from step (a) an ethylene polymer with a molecular weight lower than the ethylene copolymer obtained from step (d).

In one aspect of the present disclosure, the polymerization of ethylene to produce a relatively low molecular weight ethylene polymer (step a) is performed upstream of the copolymerization of ethylene with a comonomer to produce a relatively high molecular weight ethylene copolymer (step e). In some embodiments, step (a) is a gaseous mixture comprising ethylene, hydrogen and an inert gas which are fed to a first gas-phase reactor. In some embodiments, the gas-phase reactor was is a gas-phase fluidized bed reactor. In some embodiments, the polymerization is carried out in the presence of the previously described Ziegler-Natta catalyst. In some embodiments, no comonomer is fed to the first gas phase reactor and a highly crystalline ethylene homopolymer is obtained in step (a). In other embodiments, a minimal amount of comonomer is fed into the first gas phase reactor provided that the degree of copolymerization in step a) is limited so that the density of the ethylene polymer obtained in step (a) is not less than 0.960 g/cm$^3$.

In some embodiments, the use of and the amount used of hydrogen depends on the specific catalyst used. In some embodiments, the amount of hydrogen used is suitable to obtain in step (a) an ethylene polymer with a melt flow index MIE from 5-20 g/10 min. In order to obtain the above MIE range in step (a), the hydrogen/ethylene molar ratio used may be from about 0.5:1 to about 3:1 and the amount of ethylene monomer is from 2 to 15% by volume, based on the total volume of gas present in the polymerization reactor. In some embodiments, the amount of ethylene monomer is from about 5 to about 10% by volume. The remaining portion of the feeding mixture is represented by inert gases and one or more comonomers, if any. In some embodiments, inert gases are necessary to dissipate the heat generated by the polymerization reaction. In some embodiments, any inert gas may be used. In some embodiments, the inert gas is selected from nitrogen or saturated hydrocarbons. In some embodiments, the inert gas is propane.

In some embodiments of the present disclosure, the operating conditions of the polymerization reactor in step (a) comprising an operating temperature from about 50 to about 120° C. In some embodiments, the operating temperature is from about 65 to 100° C. In some embodiments, the operating pressure of the polymerization reactor in step (a) is from about 0.5 to about 10 MPa. In some embodiments, the operating pressure is from about 2.0 to about 3.5 MPa. In some embodiments, the operating temperature is about 80° C. and the operating pressure is about 2.9 MPa.

In some embodiments, the ethylene polymer obtained in step (a) represents from 40 to 60% by weight of the total ethylene polymer produced in the overall process, i.e. in the first and second serially connected reactors.

In some embodiments, the ethylene polymer coming from step (a) and the entrained gas are passed through a solid/gas separation step which prevents the gaseous mixture coming from the first polymerization reactor from entering the reactor of step (d) (second gas-phase polymerization reactor). In some embodiments, the gaseous mixture is recycled back to the first polymerization reactor, while the separated ethylene polymer is fed to the reactor of step (d). In some embodiments, a suitable point of feeding of the polymer into the second reactor is on the connecting part between the downcomer and the riser, wherein the solid concentration is particularly low, so that the flow conditions are not negatively affected.

In some embodiments, the operating temperature in step (d) is from about 65 to about 95° C. and the pressure is from about 1.5 to about 4.0 MPa. In some embodiments, in the second gas-phase reactor ethylene is copolymerized with one or more comonomers. Furthermore, in some embodiments, the reactor of step (d) is operated such that different conditions of monomers and hydrogen concentration are established within the riser and the downcomer.

In some aspects of the present disclosure, the gas mixture entraining the polymer particles and coming from the riser in step (d) can be partially or totally prevented from entering the downcomer, so as to obtain two different gas composition zones. In some embodiments, two different gas composition zones is achieved by feeding a gas and/or a liquid mixture into the downcomer through a line placed at a suitable point of the downcomer. In some embodiments, the line is placed in the upper part thereof. In some embodiments, the gas and/or liquid mixture has a suitable composition, different from that of the gas mixture present in the riser, such that two different gas composition zones are created. In some embodiments, the flow of the gas and/or liquid mixture can be regulated so that it produces an upward flow of gas running in a counter-current to the flow generated by the polymer particles. In some embodiments, the separation is most effective at the top thereof such that the flow acts as a barrier to the gas mixture entrained among the polymer particles coming from the riser. In particular, the ability to feed a mixture with low hydrogen content in order to produce the higher molecular weight polymer fraction in the downcomer is particularly advantageous. Additionally, one or more comonomers may be fed to the downcomer of step (d), optionally together with ethylene, propane or other inert gases.

In some embodiments, the hydrogen/ethylene molar ratio in the downcomer of step (d) is from about 0.005 to about 0.2, the ethylene concentration is from about 1 to about 20%, by volume, or the comonomer concentration is from 0.2 to 1% by volume, based on the total volume of gas present in said downcomer. In some embodiments, the ethylene concentration is from about 3 to about 10%. In some embodiments, the remainder of the volume of gas is propane or another inert gases. In some embodiments, the present disclosure provides the ability for a relatively high amount of comonomer to be incorporated into the high molecular weight polyethylene fraction.

In some embodiments, the polymer particles coming from the downcomer are reintroduced in the riser of step (d). In some embodiments, the concentration of the comonomer drops to a range of 0.1 to 0.5% by volume, based on the total volume of gas present in the riser. In some embodiments, the comonomer content and identity is controlled in order to obtain the desired density of the final polyethylene. In some embodiments, the riser contains a hydrogen/ethylene molar ratio from about 0.2 to about 1 or an ethylene concentration from about 5 to about 15% by volume based on the total volume of gas present in the riser. In some embodiments, the remainder of the total volume of gas present in the riser is propane or another inert gases.

EXAMPLES

The following examples are included to demonstrate specific embodiments of the present disclosure. It should be appreciated by those of skill in the art that the techniques disclosed in the examples which follow represent techniques discovered by the inventor to function well in the practice of the present disclosure, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the present disclosure.

Unless differently stated or implied, the following experimental methods described below are used to determine the characteristic properties reported in the detailed description and in the examples.

Density

The density is determined according to ISO 1183 at 23° C.

Molecular Weight Distribution Determination

The determination of the molar mass distributions and the means $M_n$, $M_w$, $M_z$, and $M_w/M_n$ derived there from was carried out by high-temperature gel permeation chromatography using a method described in ISO 16014-1, 16014-2, 16014-4, 2003 issues. The specifics according to the mentioned ISO standards are as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB. A WATERS Alliance 2000 equipped with the following pre-column SHODEX UT-G and separation columns SHODEX UT 806 M (3×) and SHODEX UT 807 (Showa Denko Europe GmbH, Konrad-Zuse-Platz 4, 81829 Muenchen, Germany) connected in series was used. The solvent was vacuum distilled under Nitrogen and was stabilized with 0.025% by weight of 2,6-di-tert-butyl-4-methylphenol. The flow rate used was 1 ml/min, the injection was 500 μL and polymer concentration was in the range of 0.01%<conc.<0.05% w/w. The molecular weight calibration was established by using monodisperse polystyrene (PS) standards from Polymer Laboratories (now Agilent Technologies, Herrenberger Str. 130, 71034 Boeblingen, Germany) in the range from 580 g/mol up to 11,600,000 g/mol and additionally with hexadecane. The calibration curve was then adapted to polyethylene (PE) by means of the Universal Calibration method (Benoit, et al., 1967, which is incorporated herein by reference). The Mark-Houwing parameters used herefore were for PS: $k_{PS}$=0.000121 dL/g, $\alpha_{PS}$=0.706 and for PE $k_{PE}$=0.000406 dL/g, $\alpha_{PE}$=0.725, valid in TCB at 135° C. Data recording, calibration and calculation was carried out using NTGPC_Control_V6.02.03 and NTGPC_V6.4.24 (hs GmbH, Hauptstraβe 36, D-55437 Ober-Hilbersheim, Germany) respectively.

Shear-Induced Crystallization Test

This method is utilized to determine the onset time of shear-induced crystallization (SIC) of the polymer, $t_{onset,SIC}$. Samples are melt-pressed at 200° C., 4 minutes, under 200 bar in a lab press to 1 mm thick-plaques. Disc specimens are cut-out with a diameter of 25 mm. The samples are inserted in the plate-plate oscillatory-shear rheometer. A Physica MCR 301 rotational rheometer from AntonPaar is used.

The sample is then molten inside the test-geometry at 190° C. for 4 minutes, cooled down with approximately 10 Kelvin/minute to the test temperature, T=125° C., and annealed for 5 minutes. Consequently, steady-shear under constant shear rate is applied and the shear viscosity is monitored as a function of time. The experiment is repeated applying each time a different shear-rate ranging from 0.05 to 0.5 seconds$^{-1}$. The onset time for SIC, $t_{onset,SIC}$ is taken at the point where the viscosity has increased at 50% of its steady-state value η@125° C. The steady-state value is the average of the steady-shear melt viscosity measured at the specific temperature.

The plot of log $t_{onset,SIC}$ vs. log shear-rate provides a linear function (of type y=Ax+B) which is extrapolated to a shear rate of 1000 seconds$^{-1}$ (process-relevant) to determine the value of $t_{onset,SIC}$@1000. The SIC Index is then calculated according to the following relation:

$$SIC\ Index=(t_{onset,SIC}@1000 \times t_{onset,quiescent})/(100 \times MIF)$$

The $t_{onset,quiescent}$ (in seconds) is the crystallization onset at temperature of 125° C. under quiescent conditions, i.e. no shear, measured in isothermal mode in a differential-scanning-calorimetry apparatus, DSC, as herein after explained. MIF is the melt flow index (g/10 min) measured at T=190° C. with 21.6 kilograms load, according to ISO 1133. The same protocol is described in Vittorias, 2010; Wo and Tanner, 2010; and Derakhshandeh and Hatzikiriakos, 2012, which are incorporated herein by reference.

Isothermal DSC

The $t_{onset,quiescent}$, the onset time when no deformation is applied at 125° C., is determined by the iso-DSC (isothermal Differential Scanning calorimetry) method. It is measured at 125° C. in a TA Instruments Q2000 DSC apparatus. The determination of the $t_{onset,quiescent}$ is performed utilizing the commercially available software TA Universal Analysis 2000. The sample preparation and set-up follows the DIN EN ISO 11357-1:2009 and ISO 11357-3:1999.

Complex Shear Viscosity

Complex shear viscosity is measured at angular frequency of 0.02 radians per second ("rad/s") and 190° C. as follows. Samples are melt-pressed for 4 minutes under 200° C. and 200 bar into plates of 1 mm thickness. Disc specimens of a diameter of 25 mm are stamped and inserted in the rheometer, which is pre-heated at 190° C. The measurement can be performed using any rotational rheometer commercially available. Here the Anton Paar MCR 300 is utilized, with a plate-plate geometry. A so-called frequency-sweep is performed (after 4 minutes of annealing the sample at the measurement temperature) at T=190° C., under constant strain-amplitude of 5%, measuring and analyzing the stress response of the material in the range of excitation frequencies w from 670 to 0.02 rad/s. The standardized basic software is utilized to calculate the rheological properties, i.e. the storage-modulus, G', the loss-modulus, G", the phase lag δ (=arctan(G"/G')) and the complex viscosity, η*, as a function of the applied frequency, namely η*(ω)=[G'(ω)$^2$+G"(ω)$^2$]$^{1/2}$/ω. The value of the latter at an applied frequency w of 0.02 rad/s is the eta (0.02).

Melt Flow Index

Melt flow index is determined according to ISO 1133 at 190° C. with the specified load. For MIP, the load is 5 kilograms and for MIF, the load is 21.6 kilograms.

Long Chain Branching Index (LCBI)

The LCB index corresponds to the branching factor g', measured for a molecular weight of 10$^6$ g/mol. The branching factor g', which allows determining long-chain branches at high $M_w$, was measured by Gel Permeation Chromatography (GPC) coupled with Multi-Angle Laser-Light Scattering (MALLS), as described in the following. The parameter g' is the ratio of the measured mean square radius of gyration to that of a linear polymer having the same molecular weight. Linear molecules show g' of 1, while values less than 1 indicate the presence of LCB. Values of g' as a function of mol. weight, M, were calculated from the equation:

$$g'(M)=<Rg^2>_{sample,M}/<Rg^2>_{linear\ ref,M}$$

where $<Rg^2>_M$ is the root-mean-square radius of gyration for the fraction of molecular weight M.

The radius of gyration for each fraction eluted from the GPC (as described above but with a flow-rate of 0.6 ml/min and a column packed with 30 μm particles) is measured by analyzing the light scattering at the different angles. Therefore, from this MALLS setup it is possible to determine mol. weight M and $<Rg^2>_{sample,M}$ and to define a g' at a measured M=10$^6$ g/mol. The $<Rg^2>_{linear\ ref,M}$ is calculated by the established relation between radius-of-gyration and molecular weight for a linear polymer in solution (Zimm and Stockmayer WH 1949) and confirmed by measuring a linear PE reference with the same apparatus and methodology described. The same protocol is described in Zimm and Stockmayer, 1949 and Rubinstein and Colby, 2003, both of which are incorporated herein by reference.

Atomic Absorption Spectrometry (for Mg-Content Determination)

This method was utilized to determine the residual Mg, performed with an AAS 220FS Varian (now Agilent) spectrometer. Samples are homogeneous and a double-measurement is always performed. For the sample preparation, 250 milligrams (±0.1 milligrams) of the sample are weighted and inserted in the tubes. For the solution, 6 mL of concentrated HNO$_3$ are added and the tube is sealed and introduced to a microwave oven (MLS Start 1500). The heating program followed depends upon the form of the sample.

For granulate: 5 minutes at 50° C.→15 minutes at 150° C.→10 minutes at 200° C.→10 minutes at 210° C.

For powder: 5 minutes at 50° C.→20 minutes at 150° C.→15 minutes at 200° C.→10 minutes at 210° C.

Afterwards the tubes are left to cool down to at least 60° C. The dissolved samples are transferred to 50 mL volumetric flasks, with the addition of 5 mL solution of lanthanum-chloride and 50 mL of ultrapure water. The measurement is best performed for a wave-length of 285.2 nm with an absorbance in the range of 0.0100 to 0.3500 nm. If required, samples can be further diluted to meet this range. The measurement is performed with an air/acetylene flame, with a flow rate of 13.5 and 2 liters per minute ("L/min") respectively. For the calibration, samples of concentrations between 0.01 milligrams per liter ("mg/L") to 1 mg/L are prepared and measured accordingly (from commercial reference Mg solutions).

Ti-Content Determination

The determination of Ti residual in the polymer was performed by using the mass-balance in the polymerization process.

Comonomer Content

The comonomer content is determined by means of IR in accordance with ASTM D 6248 98, using an FT-IR spectrometer Tensor 27 from Bruker, calibrated with a chemometric model for determining ethyl- or butyl-side-chains in PE for butene or hexene as comonomer, respectively. The result is compared to the estimated comonomer content derived from the mass-balance of the polymerization process and was found to be in agreement.

Swell Ratio

The Swell-ratio of the studied polymers is measured utilizing a capillary rheometer, Göttfert Rheotester2000 and Rheograph25, at T=190° C., equipped with a commercial 30/2/2/20 die (total length 30 mm, Active length=2 mm, diameter=2 mm, L/D=2/2 and 20° entrance angle) and an optical device (laser-diode from Göttfert) for measuring the extruded strand thickness. Sample is molten in the capillary barrel at 190° C. for 6 min and extruded with a piston velocity corresponding to a resulting shear-rate at the die of 1440 seconds$^{-1}$. The extrudate is cut (by an automatic cutting device from Göttfert) at a distance of 150 mm from the die-exit, at the moment the piston reaches a position of 96 mm from the die-inlet. The extrudate diameter is measured with the laser-diode at a distance of 78 mm from the die-exit, as a function of time. The maximum value corresponds to the $D_{extrudate}$. The swell-ratio is determined from the calculation: $SR=(D_{extrudate}-D_{die})100\%/D_{die}$ where $D_{die}$ is the corresponding diameter at the die exit, measured with the laser-diode.

Notched Tensile Impact Test

The tensile-impact strength is determined using ISO 8256:2004 with type 1 double notched specimens according to method A. The test specimens (4×10×80 mm) are cut form a compression molded sheet which has been prepared according ISO 1872-2 requirements (average cooling rate 15 K/min and high pressure during cooling phase). The test specimens are notched on two sides with a 45° V-notch. Depth is 2±0.1 mm and curvature radius on notch dip is 1.0±0.05 mm. The free length between grips is 30±2 mm. Before measurement, all test specimens are conditioned at a constant temperature of −30° C. over a period of from 2 to 3 hours. The procedure for measurements of tensile impact strength including energy correction following method A is described in ISO 8256.

Environmental Stress Cracking Resistance According to Full Notch Creep Test (FNCT)

The environmental stress cracking resistance of polymer samples is determined in accordance to international standard ISO 16770 (FNCT) in aqueous surfactant solution. From the polymer sample a compression molded 10 mm thick sheet has been prepared. The bars with squared cross section (10×10×100 mm) are notched using a razor blade on four sides perpendicularly to the stress direction. A notching device described in M. Fleissner in Kunststoffe 77 (1987), pp. 45 is used for the sharp notch with a depth of 1.6 mm. The load applied is calculated from tensile force divided by the initial ligament area. Ligament area is the remaining area=total cross-section area of specimen minus the notch area. For FNCT specimen: 10×10 mm$^2$−4 times of trapezoid notch area=46.24 mm$^2$ (the remaining cross-section for the failure process/crack propagation). The test specimen is loaded with standard condition suggested by the ISO 16770 with constant load of 4 MPa at 80° C. in a 2% (by weight) water solution of non-ionic surfactant ARKOPAL N100. Time until rupture of test specimen is detected.

Charpy aCN

Fracture toughness determination by an internal method on test bars measuring 10×10×80 mm which had been sawn out of a compression molded sheet with a thickness of 10 mm. Six of these test bars are notched in the center using a razor blade in the notching device mentioned above for FNCT. The notch depth is 1.6 mm. The measurement is carried out substantially in accordance with the Charpy measurement method in accordance with ISO 179-1, with modified test specimens and modified impact geometry (distance between supports). All test specimens are conditioned to the measurement temperature of −30° C. over a period of from 2 to 3 hours. A test specimen is then placed without delay onto the support of a pendulum impact tester in accordance with ISO 179-1. The distance between the supports is 60 mm. The drop of the 2 J hammer is triggered, with the drop angle being set to 160°, the pendulum length to 225 mm and the impact velocity to 2.93 m/s. The fracture toughness value is expressed in kJ/m$^2$ and is given by the quotient of the impact energy consumed and the initial cross-sectional area at the notch, aCN. Only values for complete fracture and hinge fracture can be used here as the basis for a common meaning (see suggestion by ISO 179-1).

Example 1

Process Setup

In Example 1 an embodiment of a process of the present disclosure was carried out under continuous conditions in a plant comprising two serially connected gas-phase reactors, as illustrated in the FIGURE.

In Example 1, the solid catalyst component was prepared as follows: a magnesium chloride and alcohol adduct containing about 3 moles of alcohol was prepared following the method described in example 2 of U.S. Pat. No. 4,399,054, which is incorporate herein by reference, but working at 2000 RPM instead of 10000 RPM. The adduct was subjected to a thermal treatment, under nitrogen stream, over a temperature range of 50-150° C. until a weight content of 25% of alcohol is reached. Into a 2 liter four-necked round flask, purged with nitrogen, 1 liter of TiCl$_4$ was introduced at about 0° C. Then, at about the same temperature, 70 grams of a spherical MgCl$_2$/EtOH adduct containing 25% wt of ethanol and prepared as described above is added under stirring. The temperature is raised to about 140° C. in about 2 hours and maintained for about 60 minutes. Then, the stirring is discontinued, the solid product is allowed to settle and the supernatant liquid is siphoned off.

The solid residue is then washed once with heptane at 80° C., five times with hexane at 25° C., and dried under vacuum at 30° C.

Polymerization

A sufficient amount of solid catalyst component prepared according to the above reported synthetic route was prepolymerized with propylene in amount of 1 grams polypropylene/gram of catalyst component, in accordance with the method described in Example 7 of International Patent Application WO 01/85803, which is incorporated herein by reference.

8 grams per hour ("g/h") of the prepolymerized solid catalyst component was prepared as described above and was fed, using 5 kilograms per hour ("kg/h") of liquid propane, to a precontacting apparatus, in which triisobuthylaluminum (TIBA) was dosed. The weight ratio between aluminum alkyl and solid catalyst component was 2.5:1. The precontacting step was carried out under stirring at 25° C. with a total residence time of 120 minutes.

With reference to the FIGURE for illustrative purposes, the catalyst entered a first gas-phase polymerization reactor 1 of the FIGURE via line 10. In reactor 1, at least a first amount of ethylene was polymerized using $H_2$ as molecular weight regulator and in the presence of propane as an inert diluent. 41.5 kg/h of ethylene and 65 g/h of hydrogen were fed to reactor 1 via line 9 after passing through a compressor 2 and a condenser 3. No comonomer was fed to reactor 1. In an optional embodiment, the hydrogen, ethylene and propane may be reintroduced into reactor 1 via line 4 by compressor 2 and condenser 3 of from a recycling line 13 (shown in dash because the stream is optional) of the first gas-phase polymerization reactor 1.

The polymerization was carried out at a temperature of 80° C. and at a pressure of 2.9 MPa. The operating conditions of reactor 1 are summarized in Table 1. The polymer obtained in reactor 1 was discontinuously discharged via line 11, separated from the gas into a gas/solid separator 12, and reintroduced into the second gas-phase reactor 20 via line 14. In some embodiments of the present disclosure, the gas separated from separator 12 can be introduced into the reactor 1 via recycling line 13 (shown in dash because the stream is optional) or vented from the system via line 15.

The polymer produced in the first reactor had a melt index MIE of about 10 g/10 min and a density of 0.966 kg/dm³.

The second reactor 20 was operated under polymerization conditions of about 84° C., and a pressure of 2.5 MPa. 9 kg/h of ethylene, 6 g/h of hydrogen and 0.8 kg/h of 1-hexene were introduced in a downcomer (also referred to herein as a second polymerization zone) 33 of second reactor 20 via line 46. 5 kg/h of propane, 27 kg/h of ethylene and 5 g/h of hydrogen were fed through line 45 into line 44 of the recycling system. After passing through a second-reactor compressor 47 the propane, ethylene, and hydrogen were split by line 56 into a second-reactor first condenser 48 and a second-reactor second condenser 49.

Applicant presently believes that in order to broaden the molecular weight distribution of the final ethylene polymer, second reactor 20 was operated by establishing different conditions of monomers and hydrogen concentration within a riser (also referred to herein as a first polymerization zone) 32 and downcomer 33. Applicant presently believes that the different conditions were achieved by feeding via line 52, 330 kg/h of a liquid stream (liquid barrier) into an upper part, portion, or region of downcomer 33. The liquid stream 52 had a composition different from that of the gas mixture present in riser 32. The different concentrations of monomers and hydrogen within riser 32 and downcomer 33 of second reactor 20, and the composition of the liquid barrier, are indicated in Table 2. The liquid stream of line 52 comes from the condensation step in second-reactor second condenser 49, at working conditions of 46.degree. C. and 2.5 MPa, wherein a part of the recycle stream via line 57 is cooled and partially condensed. As shown in the FIGURE, a separating vessel 50 and a pump 51 are placed, in that order, downstream of second-reactor second condenser 49. Furthermore, the hydrogen, ethylene, and/or the comonomer can be recycled through the system through line 55 into either riser 32 or downcomer 33 via compressor 47 and condenser 48. The final polymer was discontinuously discharged via line 54.

The polymerization process in the second reactor produced relatively high molecular weight polyethylene fractions. In Table 3 the properties of the final product are specified. Applicant presently believes that Table 3 illustrates that the melt index of the final product is decreased as compared to the ethylene resin produced in the first reactor, showing the formation of high molecular weight fractions in the second reactor.

The first reactor produced around 50% by weight (split wt %) of the total amount of the final polyethylene resin produced by both first and second reactors. At the same time, the obtained polymer had a relatively broad molecular weight distribution as witnessed by a ratio MIF/MIP equal to 21.8.

Comparative Example 1

The polymer of this comparative example 1 was a prior art polyethylene composition prepared with a Cr catalyst, in a loop reactor.

TABLE 1

Operative Conditions for First Reactor

| Operative conditions first reactor | Example 1 |
|---|---|
| $H_2/C_2H_4$ Molar ratio | 1.9 |
| $C_2H_4$ % | 6 |
| Split (wt %) | 50 |

Notes:
$H_2$ = hydrogen gas; $C_2H_4$ = ethylene;

TABLE 2

Operative Conditions for Second Reactor

| Operative conditions second reactor | Example 1 |
|---|---|
| $H_2/C_2H_4$ Molar ratio riser | 0.47 |
| $C_2H_4$ % riser | 10.7 |
| $C_6H_{12}$ % riser | 0.09 |
| $H_2/C_2H_4$ Molar ratio downcomer | 0.057 |
| $C_2H_4$ % downcomer | 5.1 |
| $C_6H_{12}$ % downcomer | 0.47 |
| $H_2/C_2H_4$ Molar ratio barrier | 0.050 |
| $C_2H_4$ % barrier | 6.2 |
| $C_6H_{12}$ % barrier | 0.55 |

Notes:
$H_2$ = hydrogen gas; $C_2H_4$ = ethylene; $C_6H_{12}$ = hexene

TABLE 3

Final Polymer Properties of Example
1 and Comparative Example 1

| Property | Example 1 | Comparative Example 1 |
|---|---|---|
| MIP [5 kg](g/10 min.) | 1.33 | 1.46 |
| MIF [21.6 kg](g/10 min.) | 29 | 33 |
| MIF/MIP | 22 | 22 |
| Density (g/cm$^3$) | 0.953 | 0.953 |
| $M_w$ [g/mol] | 268,000 | 167,000 |
| $M_z$ [g/mol] | 1,530,000 | 945,000 |
| $M_w/M_n$ | 26 | 19 |
| Titanium content [ppm by weight] | 2.66 | — |
| Magnesium content [ppm by weight] | 8.75 | — |
| LCBI | 0.53 | 0.81 |
| Comonomer content IR [% by weight] | 0.8 ($C_6H_{12}$) | <0.8 ($C_6H_{12}$) |
| SIC index | 0.2 | 0.1 |
| Eta (0.02) | 41,890 | 62,870 |
| Swell ratio (%) | 163 | 165 |
| Tensile Notch Impact T = −30° C. [kJ/m$^2$] | 83 | 83 |
| Charpy aCN, T = −30° C. [kJ/m$^2$] | 4.5 | 4.5 |
| FNCT 4 MPa/80° C. (hours)* | 2.8 | 1.6 |

Notes:
*aqueous solution of 2% Arkopal N100

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

REFERENCES

The following references, to the extent that they provide exemplary procedural or other details supplementary to those set forth herein, are specifically incorporated herein by reference: U.S. Pat. No. 4,298,718; U.S. Pat. No. 4,399,054; U.S. Pat. No. 4,469,648; U.S. Pat. No. 4,495,338; U.S. Pat. No. 4,536,550; U.S. Pat. No. 4,829,034; U.S. Pat. No. 5,100,849; International Patent Application WO 1994/012568; International Patent Application WO 1998/044009; International Patent Application WO 2001/085803; International Patent Application WO 2005/097888; European Patent 395,083; Geldart, "Gas Fluidization Technology," J. Wiley & Sons, Ltd., p 155, 1986.; Benoit, et al., *J. Polymer Sci., Phys. Ed.*, 5:753, 1967; Vittorias, "*Correlation among structure, processing and product properties*," Würzburger Tage, Wolfgang Kunze T A Instruments, Germany, 2010; Wo and Tanner, "The impact of blue organic and inorganic pigments on the crystallization and rheological properties of isotactic polypropylene," *Rheol. Acta*, 49:75, 2010; Derakhshandeh and Hatzikiriakos, "Flow-induced crystallization of high-density polyethylene: the effects of shear and uniaxial extension," *Rheol. Acta*, 51:315-327, 2012; Rubinstein and Colby, "Polymer Physics," Oxford University Press, 2003' Zimm and Stockmayer, "The dimensions of chain molecules containing branches and rings," *J Chem Phys*, 17, 1949.

What is claimed is:

1. A process for preparing a polyethylene composition comprising the following steps:
   (a) providing at least a first amount of ethylene to a first gas-phase reactor;
   (b) providing at least a first amount of Ziegler-Natta catalyst to the first gas-phase reactor to produce at least a first amount of polyethylene polymer within the first gas-phase reactor;
   (c) transferring at least a portion of the first amount of polyethylene polymer and at least a portion of the first amount of Ziegler-Natta catalyst to a second gas-phase reactor;
   (d) providing at least a second amount of ethylene in the presence of a first amount of hydrogen to the second gas-phase reactor to obtain a second polyethylene polymer to produce a polyethylene composition comprising the first polyethylene polymer and the second polyethylene polymer, wherein the polyethylene composition comprises a density of greater than about 0.950 g/cm$^3$, a ratio of MIF/MIP from about 17 to about 25, a long-chain branching index lower than about 0.70, and a SIC index from about 0.15 to about 8, wherein the SIC Index is determined according to the following relation:

$$SIC\ Index = (t_{onset,SIC}@1000 \times t_{onset,quiescent})/(100 \times MIF)$$

wherein $t_{onset,SIC}@1000$ is measured in seconds and is the time required for crystallization onset under shear rate of 1000 s$^{-1}$, the $t_{onset,quiescent}$ is measured in seconds and is the crystallization onset time at temperature of 125° C. under no shear, determined in isothermal mode by differential scanning calorimetry;
   wherein at least one of the first or second gas-phase reactors comprises a first and second polymerization zone, the first polymerization zone having a first hydrogen pressure and the second polymerization zone having a second hydrogen pressure, wherein the first hydrogen pressure and the second hydrogen pressure are different such that at least a portion of the second amount of ethylene moves through the first and second polymerization zones and at least a portion of a gas mixture of each polymerization zone is partially or totally prevented from entering the other zone wherein the polyethylene composition comprises:
   (A) from about 40 to about 60% by weight of an ethylene homopolymer or copolymer with density equal to or greater than about 0.960 g/cm$^3$ and melt flow index (MIE) at 190° C. with a load of 2.16 kilograms of about 5 to about 20 grams/10 minute; and
   (B) from about 40 to about 60% by weight of an ethylene homopolymer or copolymer having a MIE value lower than the MIE value of (A).

2. The process of claim 1, wherein the first polymerization zone is under fast fluidization or transport conditions.

3. The process of claim 1, wherein step (a) and/or step (d) further comprise one or more comonomers.

4. The process of claim 1, wherein the first gas-phase reactor and/or the second gas-phase reactor further comprises polymerizing ethylene in an inert diluent.

5. The process of claim 1, wherein the first and second gas-phase reactors are heated to a temperature ranging from about 70° C. to about 95° C.

6. The process of claim 1, wherein the Ziegler-Natta catalyst comprises a solid catalyst component comprising a titanium compound on a magnesium support and an organoaluminum compound.

7. The process of claim 6, wherein the solid catalyst component is produced by contacting the titanium compound with magnesium chloride or a precursor magnesium compound and heating to a temperature ranging from about 130° C. to about 150° C.

8. The process of claim 1, wherein the SIC Index ranges from about 0.15 to about 2.

9. A polyethylene composition comprising:
(a) first polyethylene produced in a first gas-phase reactor in the presence of a first amount of hydrogen; and
(b) a second polyethylene produced in a second gas-phase reactor in the presence of a second amount of hydrogen, wherein the second amount of hydrogen is less than the first amount of hydrogen;
wherein the first polyethylene and the second polyethylene are produced in any order and in the presence of a Ziegler-Natta catalyst, wherein at least one of the first or second gas-phase reactors comprises a first and second polymerization zone, the first polymerization zone having a first hydrogen pressure and the second polymerization zone having a second hydrogen pressure, wherein the first hydrogen pressure and the second hydrogen pressure are different such that at least a portion of the second amount of ethylene moves through the first and second polymerization zones and at least a portion of a gas mixture of each polymerization zone is partially or totally prevented from entering the other zone, and
wherein the polyethylene composition further comprises a SIC Index from about 0.15 to about 8 and wherein the SIC Index is determined according to the following relation:

$$SIC\ Index = (t_{onset,SIC}@1000 \times t_{onset,quiescent})(100 \times MIF)$$

where $t_{onset,SIC}@1000$ is measured in seconds and is the time required for crystallization onset under shear rate of 1000 s$^{-1}$, the $t_{onset,quiescent}$ is measured in seconds and is the crystallization onset time at temperature of 125° C. under no shear, determined in isothermal mode by differential scanning calorimetry wherein the polyethylene composition comprises
(A) from about 40 to about 60% by weight of an ethylene homopolymer or copolymer with density equal to or greater than about 0.960 g/cm$^3$ and melt flow index (MIE) at 190° C. with a load of 2.16 kilograms of about 5 to about 20 grams/10 minutes; and
(B) from about 40 to about 60% by weight of an ethylene homopolymer or copolymer having a MIE value lower than the MIE value of (A).

10. The polyethylene composition of claim 9, wherein the first polymerization zone is under fast fluidization or transport conditions.

11. The polyethylene composition of claim 9, wherein the first or second polyethylene contains one or more comonomers.

12. The polyethylene composition of claim 9, wherein the first gas-phase reactor and the second gas-phase reactor is heated to a temperature from about 70° C. to about 95° C.

13. The polyethylene composition of claim 9, wherein the Ziegler-Natta catalyst comprises a solid catalyst component comprising a titanium compound on a magnesium support and an organoaluminum compound.

14. The polyethylene composition of claim 9, wherein the polyethylene composition comprises a density of greater than about 0.950 g/cm$^3$, a ratio of MIF/MIP from about 17 to about 25, a SIC Index ranging from about 0.15 to about 2, and a long-chain branching index lower than about 0.70.

15. A polyethylene composition comprising:
(A) from about 40 to about 60% by weight of an ethylene homopolymer or copolymer with density equal to or greater than about 0.960 g/cm$^3$ and melt flow index (MIE) at 190° C. with a load of 2.16 kilograms of about 5 to about 20 grams/10 minutes; and
(B) from about 40 to about 60% by weight of an ethylene homopolymer or copolymer having a MIE value lower than the MIE value of (A),
wherein the polyethylene composition has:
(i) a density greater than about 0.950 g/cm$^3$;
(ii) a ratio of MIF/MIP from about 17 to about 25;
(iii) a SIC index from about 0.15 to about 8, wherein the SIC Index is determined according to the following relation:

$$SIC\ Index = (t_{onset,SIC}@1000 \times t_{onset,quiescent})(100 \times MIF)$$

wherein $t_{onset,SIC}@1000$ is measured in seconds and is the time required for crystallization onset under shear rate of 1000 s$^{-1}$, the $t_{onset,quiescent}$ is measured in seconds and is the crystallization onset time at temperature of 125° C. under no shear, determined in isothermal mode by differential scanning calorimetry; and
(iv) a long-chain branching index lower than about 0.70.

16. The polyethylene composition of claim 15, having:
an eta (0.02) ranging from about 30,000 to about 65,000 Pascal seconds, wherein eta (0.02) is the complex shear viscosity at an angular frequency of 0.02 rad/s, measured with dynamic oscillatory shear in a plate-plate rotational rheometer at a temperature of 190° C.

17. The polyethylene composition of claim 15, further comprising at least one characteristic selected from:
(a) a $M_w$ equal to or lower than about 320,000 grams/mole;
(b) a $M_w/M_n$ ratio from about 20 to about 30;
(c) a MIP from about 0.9 to about 2.1 grams/10 minutes;
(d) a MIF from about 20 to about 45 grams/10 minutes;
(e) a comonomer content equal to or less than about 1.2% by weight; and
(f) the SIC Index ranging from about 0.15 to about 2.

* * * * *